8815X
Mitchell & Fairbanks,
Washing Machine,
Patented May 9, 1835.
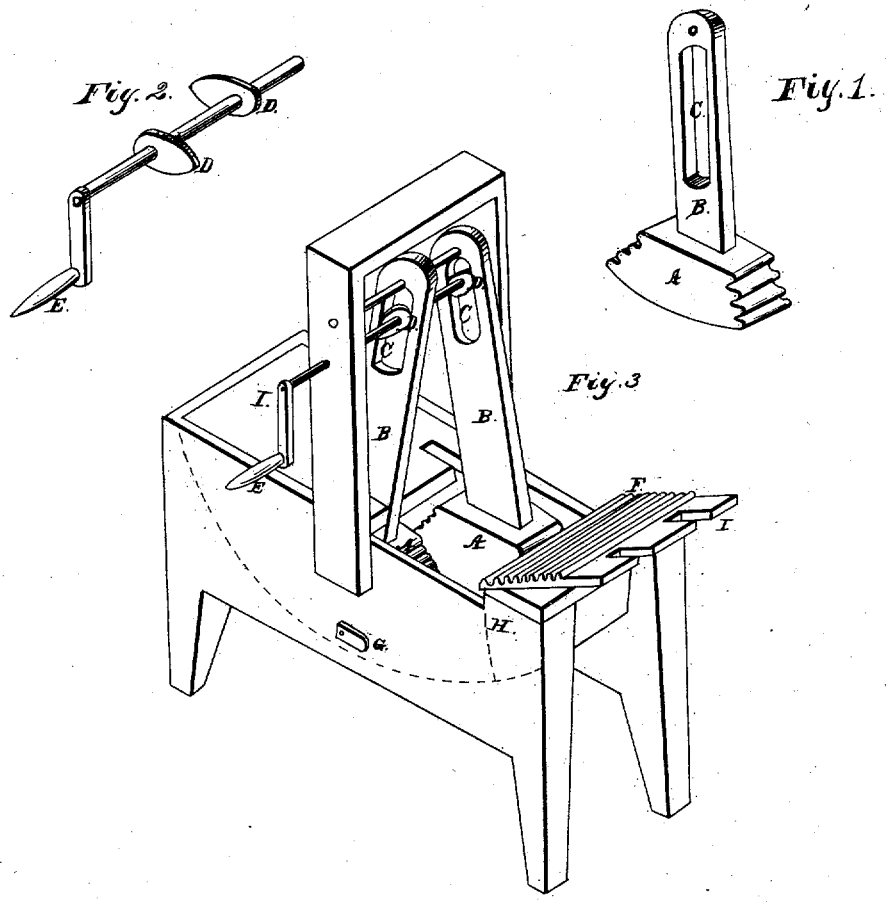
N. PETERS, PHOTO-LITHOGRAPHER, WASHINGTON, D. C.

6815X May 9.1855

John B. Mitchell & Sylvanus, Fairbanks

Letters Patent.

The schedule referred to in these Letters Patent and making part of the same containing a description in the words of the said John B. Mitchell & Sylvanus Fairbanks themselves of their improvement in the Washing Machine and Churn, To all to whom these presents shall come —

Be it known that John B. Mitchell and Sylvanus Fairbanks of Readfield in the county of Kennebec and State of Maine, have invented a new and useful improvement in the washing machine and Churn, and that the following is a full and exact description of the construction and operation of the said machine, reference being had to the accompanying plate. fig 1. Represents one of the stocks, or fluted blocks similar to those used in common fulling mills & of a size suitable to the size of the machine to be constructed. A. is the stock or block fluted on each side. B. is the standard attached thereto having a slot C. in the upper end sufficiently large to allow the ~~cone~~ cam its proper play. Fig 2 is the shaft of the crank E, having two cams D.D attached to it. these cams are made of iron or steel or any other material suitable therefor and are placed upon the shaft in such a manner that their points are opposite to each other. Fig 3. is the machine in action. the stocks and cams are put into a frame having a box or cistern of a convenient size. (greater or smaller according to the wants of the operator) this cistern has a concave bottom so as to conform to the curve made by the stocks as they swing to and fro. and at the ends, a movable board or end placed at an angle with the horizon as represented by the dotted line H, by turning the crank E, the cams D.D, push them alternately one way and the other. There are two lids I.I. which open towards the ends. On the under side of these lids we have attached fluted boards so that the operator can finish any particular part of the clothes as wristbands collars, &c. that may not be washed clean by the usual pressure of the stocks. A portion of the clothes are put in at each end of the cistern, as in common fulling mills At G. is a button having leather on the side next the cistern and secured on tightly. when you wish to empty out the water, you can push the button round and
open the orifice and let the water escape;

Claims. What we specifically claim as our invention and for which
we desire an exclusive right is 1. The application of cams, for pushing or
putting into operation stocks for washing machiny, fulling mills, tanners mills
for softening hides churns &c. — 2. The application of the fluted wash-
board, to the lids of the washing machine as above described.

In testimony that the above is a true specification of our
said improvement as above described, we have hereunto set our hands this
day of March in the Year of our Lord 1835, Witnesses
G. A. Benson
P. Benson Jnr.

John B. Mitchell:
Sylvanus Fairbanks.

(Drawing)

[illegible]
[illegible]

600 [illegible]